United States Patent
Chaaraoui et al.

(10) Patent No.: US 10,397,472 B2
(45) Date of Patent: *Aug. 27, 2019

(54) AUTOMATIC DETECTION OF PANORAMIC GESTURES

(71) Applicant: Google LLC, Mountain View, CA (US)

(72) Inventors: Alexandros Andre Chaaraoui, Benidorm (ES); Carlos Hernandez Esteban, Kirkland, WA (US); Li Zhang, Seattle, WA (US); Steven Maxwell Seitz, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,450

(22) Filed: Feb. 21, 2018

(65) Prior Publication Data

US 2018/0183997 A1 Jun. 28, 2018

Related U.S. Application Data

(63) Continuation of application No. 14/717,492, filed on May 20, 2015, now Pat. No. 9,936,128.

(51) Int. Cl.
*H04N 5/232* (2006.01)
*G03B 27/00* (2006.01)
*G06F 3/01* (2006.01)

(52) U.S. Cl.
CPC ......... *H04N 5/23225* (2013.01); *G03B 27/00* (2013.01); *G06F 3/017* (2013.01); *H04N 5/23238* (2013.01); *H04N 5/23245* (2013.01)

(58) Field of Classification Search
CPC .............................................. H04N 5/23238
See application file for complete search history.

(56) References Cited

U.S. PATENT DOCUMENTS 6,714,249 B2  3/2004  May et al.
8,068,693 B2  11/2011 Sorek et al.
(Continued)

FOREIGN PATENT DOCUMENTS

EP        2545411 A1      1/2013
WO    20100132025 A1   11/2010

OTHER PUBLICATIONS

EunSeok Choi; WonChul Bang; SungJung Cho; Jing Yang; DongYoon Kim; Sang Ryong Kim, "Beatbox music phone: gesturebased interactive mobile phone using a triaxis accelerometer," Industrial Technology, 2005. ICIT 2005. IEEE International Conference on, vol., No., pp. 97, 102, 1417 Dec. 2005 doi: 10.1109/ICIT.2005. 1600617.

(Continued)

*Primary Examiner* — Eileen M Adams
(74) *Attorney, Agent, or Firm* — Lerner, David, Littenberg, Krumholz & Mentlik, LLP

(57) ABSTRACT

Aspects of the disclosure relate to capturing panoramic images using a computing device. For example, the computing device may record a set of video frames and tracking features each including one or more features that appear in two or more video frames of the set of video frames within the set of video frames may be determined. A set of frame-based features based on the displacement of the tracking features between two or more video frames of the set of video frames may be determined by the computing device. A set of historical feature values based on the set of frame-based features may also be determined by the computing device. The computing device may determine then whether a user is attempting to capture a panoramic image based on the set of historical feature values. In response, the computing device may capture a panoramic image.

20 Claims, 10 Drawing Sheets

(56) References Cited

U.S. PATENT DOCUMENTS

| | | | |
|---|---|---|---|
| 8,212,882 B2 | 7/2012 | Florea et al. | |
| 8,217,989 B2 | 7/2012 | Kim et al. | |
| 8,279,265 B2 * | 10/2012 | Tseng | H04N 5/23293 |
| | | | 348/36 |
| 8,411,133 B2 | 4/2013 | Kim et al. | |
| 9,479,703 B2 * | 10/2016 | Yu | G01S 3/7864 |
| 9,560,274 B2 * | 1/2017 | Hirata | H04N 5/23232 |
| 9,936,128 B2 * | 4/2018 | Chaaraoui | H04N 5/23238 |
| 2004/0189849 A1 | 9/2004 | Hofer | |
| 2008/0192005 A1 | 8/2008 | Elgoyhen et al. | |
| 2009/0231447 A1 * | 9/2009 | Paik | G01S 3/7864 |
| | | | 348/208.4 |
| 2010/0194852 A1 * | 8/2010 | Tseng | H04N 5/232 |
| | | | 348/36 |
| 2012/0154579 A1 | 6/2012 | Hampapur et al. | |
| 2012/0300020 A1 | 11/2012 | Arth et al. | |
| 2014/0168422 A1 * | 6/2014 | Feng | H04N 5/2252 |
| | | | 348/135 |
| 2014/0300688 A1 | 10/2014 | Shin | |
| 2015/0271402 A1 * | 9/2015 | Guo | H04N 5/23238 |
| | | | 348/39 |
| 2016/0344930 A1 | 11/2016 | Chaaraoui et al. | |

OTHER PUBLICATIONS

Zhenyu He; Jin, Lianwen; Lixin Zhen; Jiancheng Huang, "Gesture recognition based on 3D accelerometer for cell phones interaction," Circuits and Systems, 2008. APCCAS 2008. IEEE Asia Pacific Conference on , vol., No., pp. 217,220, Nov. 30, 2008Dec. 3 2008 doi: 10.1109/APCCAS.2008.4745999.

Vo Quang Viet; Gueesang Lee; Deokjai Choi, "Fall Detection Based on Movement and Smart Phone Technology," Computing and Communication Technologies, Research, Innovation, and Vision for the Future (RIVF), 2012 IEEE RIVF International Conference on, vol., No., pp. 1,4, Feb. 27, 2012-Mar. 1, 2012 doi: 10.1109/rivf.2012.6169847.

Gandhi, T.; Trivedi, M.M., "Pedestrian collision avoidance systems: a survey of computer vision based recent studies," Intelligent Transportation Systems Conference, 2006. ITSC '06. IEEE , vol., No., pp. 976, 981, 1720 Sep. 2006 doi: 10.1109/ITSC.2006.1706871.

Weiming Hu; Tieniu Tan; Liang Wang; Maybank, S., "A survey on visual surveillance of object motion and behaviors," Systems, Man, and Cybernetics, Part C: Applications and Reviews, IEEE Transactions on, vol. 34, No. 3, pp. 334, 352, Aug. 2004 doi: 10.1109/TSMCC.2004.829274.

Mohamed Seddeik Yasein et al. "New methods for image registration and normalization using image feature points." Jan. 1, 2008 (Jan. 1, 2008). XP055286919, ISBN: 978-0-494-41216-9. Retrieved from the Internet: <http://citeseerx.st.psu.edu/viewdoc/download?doi=10.1.1.513.3631&rep=rep1&type=pdf>.

International Search Report and Written Opinion dated Jul. 20, 2016, for International Patent Application No. PCT/US2016/033244.

Tan et al., "User detection in Real time panoraminc view through image synchronization using multiple camera in cloud", Feb. 16-19, 2014, 6 pages.

Abbreviated Examination Report for UK Patent Application No. GB1714753.9 dated Nov. 15, 2017. 2 pages.

International Preliminary Report on Patentability for International Application No. PCT/US2016/033244 dated Nov. 30, 2017. 9 pages.

* cited by examiner

300

AUTOMATIC DETECTION OF PANORAMIC GESTURES

CROSS-REFERENCE TO RELATED APPLICATION

The present application is a continuation of U.S. patent application Ser. No. 14/717,492, filed May 20, 2015, the disclosure of which is incorporated herein by reference.

BACKGROUND

Many computing devices such as smartphones, digital cameras (compact, bridge, and SLR), and tablets enable users to capture panoramic images. These computing devices need to be placed in a panoramic image capture mode prior to capturing a panoramic image. In some examples, active user input through a user interface or by toggling a switch is required to place the computing device into a panoramic image capture mode. The need for user input prior to capturing a panoramic image may result in missing a photo opportunity or a user not being aware of the ability to capture a panoramic image.

SUMMARY

Embodiments within the disclosure generally relate to automatically capturing panoramic images. One aspect includes a method for capturing panoramic images on a device. A set of video frames may be recorded by one or more processing devices. The one or more processing devices may then determine tracking features, each including one or more features that appear in two or more video frames of the set of video frames within the set of video frames; determine a set of frame-based features based on the displacement of the tracking features between two or more video frames of the set of video frames; determine a set of historical feature values based on the set of frame-based features; determine whether a user is attempting to capture a panoramic image based on the set of historical feature values; and capture a panoramic image in response to determining that the user is attempting to capture a panoramic image.

Another embodiment provides a system for capturing panoramic images. The system may include one or more computing devices; and memory storing instructions, the instructions executable by the one or more computing devices. The instructions may include recording, with the or more computing devices, a set of video frames; determining, with the one or more computing devices, tracking features each including one or more features that appear in two or more video frames of the set of video frames within the set of video frames; determining, with the one or more computing devices, a set of frame-based features based on the displacement of the tracking features between two or more video frames of the set of video frames; determining, with the one or more computing devices, a set of historical feature values based on the set of frame-based features; determining, with the one or more computing devices, whether a user is attempting to capture a panoramic image based on the set of historical feature values; and capturing, with the one or more computing devices, a panoramic image in response to determining that the user is attempting to capture a panoramic image.

One embodiment provides a non-transitory computer-readable medium storing instructions. The instructions, when executed by one or more processors, may cause the one or more processors to perform the steps of: recording a set of video frames; determining tracking features each including one or more features that appear in two or more video frames of the set of video frames within the set of video frames; determining a set of frame-based features based on the displacement of the tracking features between two or more video frames of the set of video frames; determining a set of historical feature values based on the set of frame-based features; determining whether a user is attempting to capture a panoramic image based on the set of historical feature values; and capturing a panoramic image in response to determining that the user is attempting to capture a panoramic image.

DETAILED DESCRIPTION

Overview

Figure 1:
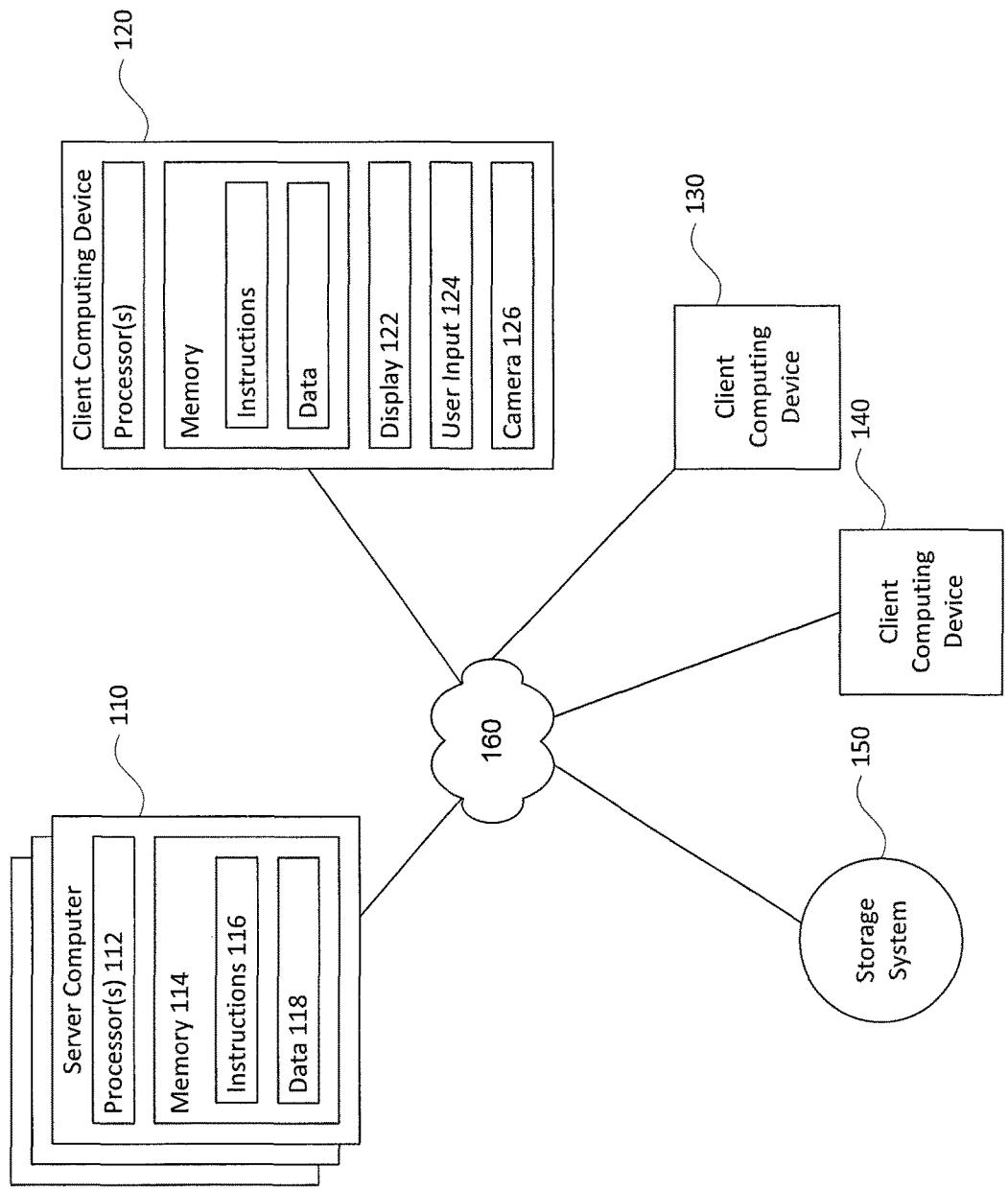
FIG. 1 is a functional diagram of an example system in accordance with aspects of the disclosure.

The technology relates to automatically capturing panoramic images without requiring that a camera of a computing device first be operating in a "panoramic capture" mode. For example, a user may put a computing device having a camera into an image or video capture mode, and begin moving the device linearly in various directions as if he or she was attempting to capture a panoramic image. While doing so, the computing device may record video frames and analyze the motion of the computing device (or the camera of the computing device). When the computing device confirms that the motion corresponds to a user attempting to capture a panoramic image, the computing device may automatically switch to a panoramic capture mode or simply convert the recorded video frames into a panoramic image. Thus, movement of the computing device by the user may be used to capture a panoramic image even where the computing device is not operating in a panoramic capture mode.

In order to detect motion associated with an attempt to take a panoramic image, each of the recorded video frames may be analyzed. For example, each recorded video frame may be analyzed to determine and map gradient-based key points or tracking features between frames of the recoded video frames. Tracking features may include windows of pixels which contain sufficient texture to enable their matching between recorded video frames.

A set of frame-based features may be determined from the tracking features. For instance, the set of frame-based features may include a median displacement of all tracking features in the positive and negative X axis, a median displacement of all tracking features in the positive and negative Y axis, and a median angle difference to axis aligned motion of all tracking features.

Sets of frame-based feature elements may be accumulated in order to determine historical feature values for the recorded video frames. The historical feature values may be determined using the set of frame-based feature elements for all of the recorded video frames currently within the sliding window. The historical feature values may include an amount of motion, the axis alignment of that motion, and the angle of that motion.

Each of the historical feature values may be evaluated to determine whether or not a user is attempting to capture a panoramic image. For example, when the amount and angle of motion is within a predetermined range this may indicate that a user is attempting to capture a panoramic image. In one example, when all of the historical feature values are within the predetermined thresholds, the computing device may determine that the user is attempting to capture a panoramic image or panorama.

Once the computing device has determined that the user is attempting to capture a panoramic image, the computing device may switch to a panoramic image capture mode. In this regard, one or more of the recorded video frames and one or more additional video frames captured after the determination may be used to generate a panoramic image. In some examples, the same techniques used to track the tracking features between recorded video frames may also be used to generate the panoramic image.

When any one of the historical feature values is outside of these predetermined ranges, this may indicate that the user is not attempting to capture a panoramic image. In this case, the computing device may continue to determine and evaluate the historical feature values as additional images are captured and processed as discussed herein. This may continue until the computing device has determined that the user is attempting to capture a panoramic image or until a maximum number of video frames have been recorded.

The features described herein may allow for the automatic detection of when a user is attempting to capture a panoramic image. By doing so, a computing device may capture a panorama without the need for specific user input selecting a panoramic image capture mode. This may cause users to capture more panoramic images, avoid situations in which a user thought he or she was capturing a panoramic image but was not, and increase user interest in panoramic images in general. The features may also provide performance advantages over other techniques as they do not require the use of other sensors on the computing device (the use of which can reduce battery life of the computing device). Additionally, the techniques used to track the tracking features may also be used to generate panoramic images.

Example Systems

Figure 2:
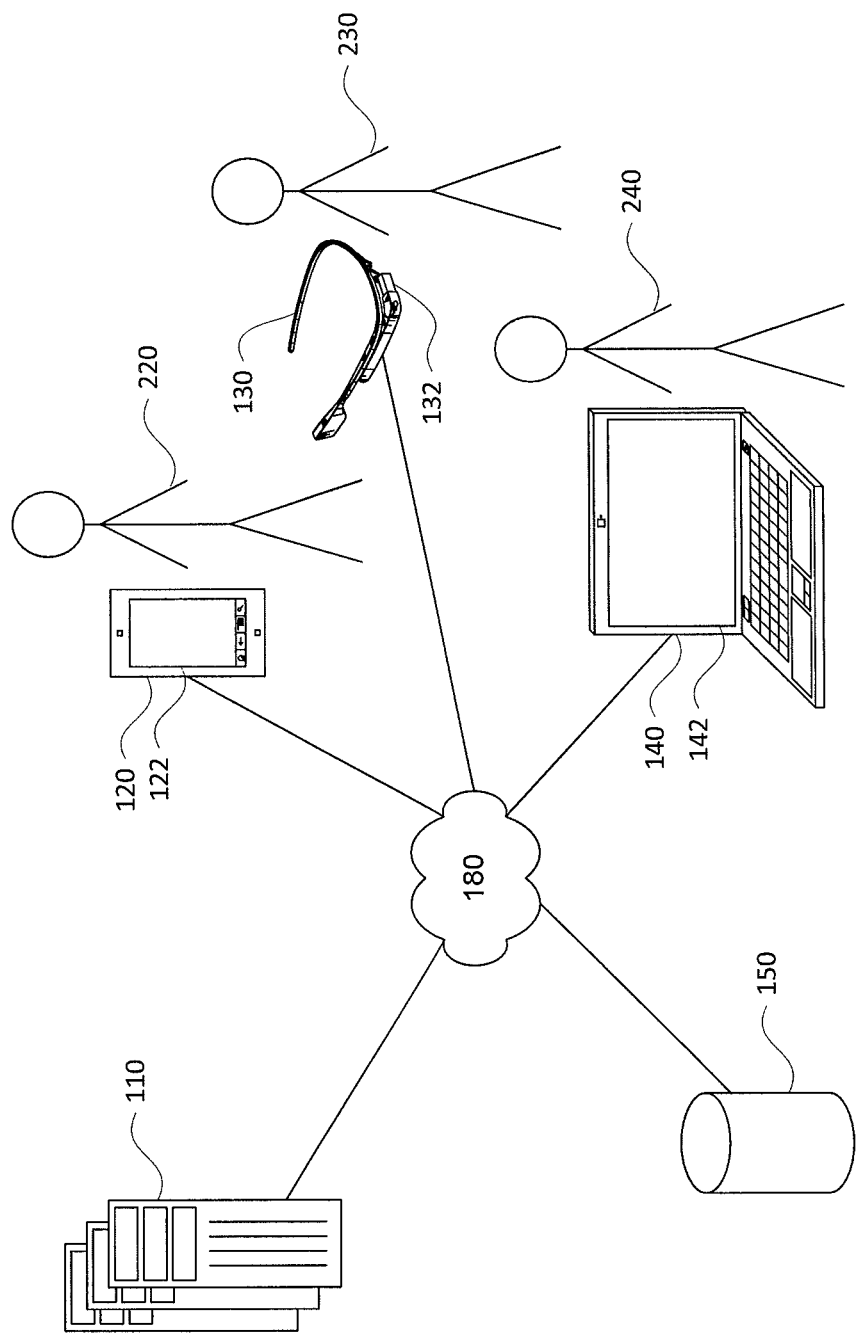
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Example Methods

Figure 3:
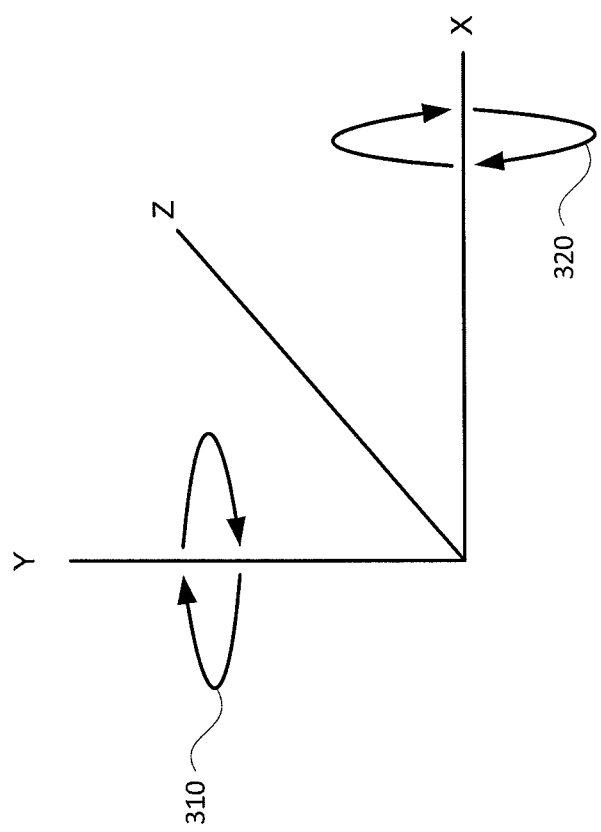
FIG. 3 is an example of computing device motion in accordance with aspects of the disclosure.

A user may put a computing device having a camera into an image or video capture mode, and begin moving the device linearly in various directions as if he or she was attempting to capture a panoramic image. In this regard, the computing device may be moved along a linear horizontal or vertical axis. For example, a user such as user 220 using client computing device 120 may move the computing device in a linear horizontal or vertical motion when capturing a panoramic image using camera 126. FIG. 3 is an example 300 of different types of motion that would be expected when a user is attempting to capture a panoramic image. In this regard, horizontal motion 310 around y-axis may be used to create a panoramic image in a landscape format. Vertical motion around x-axis 320 may be used to create a panoramic image in a portrait format.

Figure 4B:
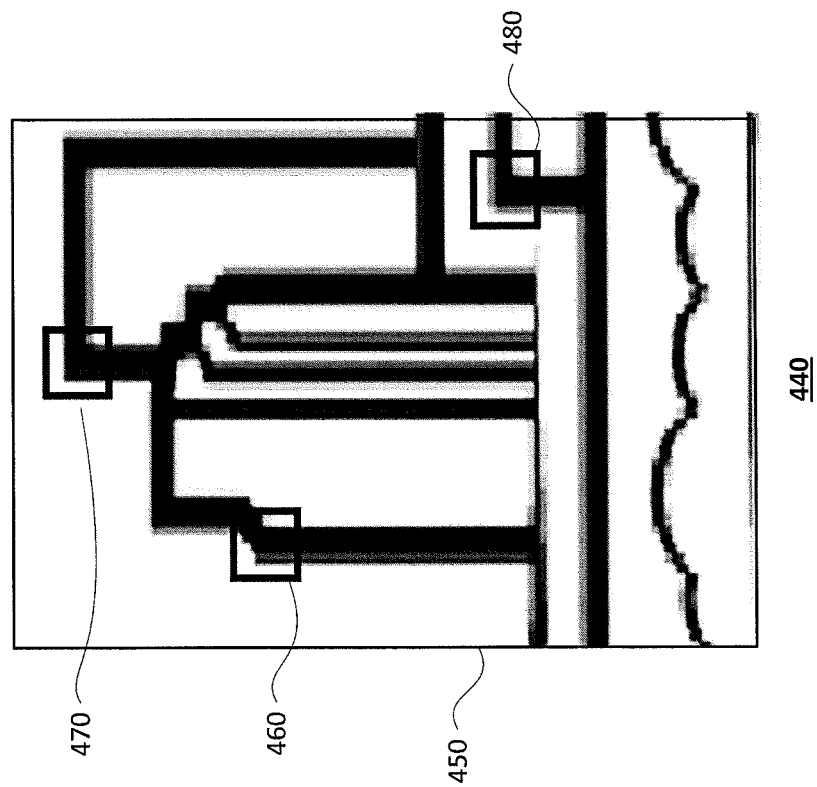
FIG. 4B is an example of an image and tracking features in accordance with aspects of the disclosure.
Figure 4A:
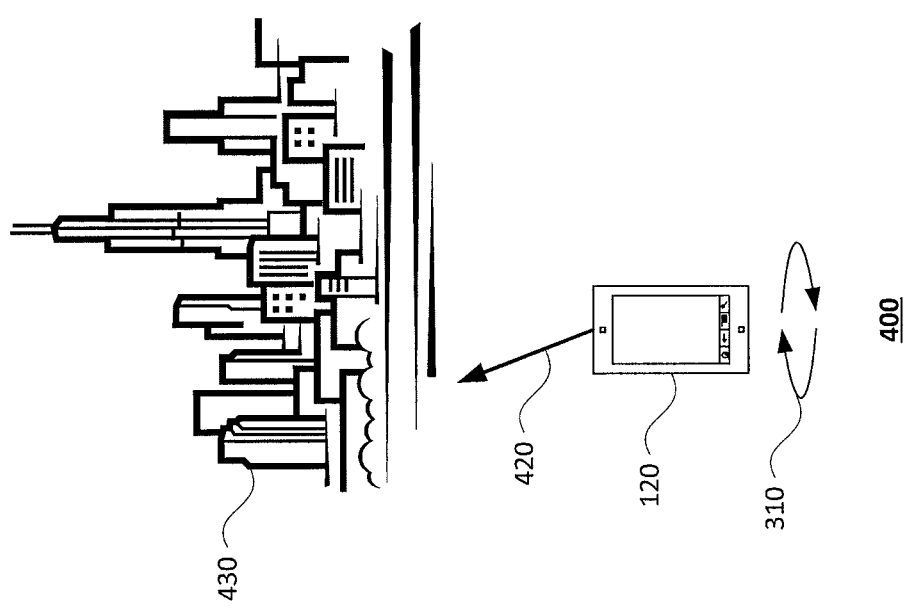
FIG. 4A is an example of a computing device and capturing an image in accordance with aspects of the disclosure.

While the computing device is being moved as discussed above, the computing device may record video frames and analyze the motion of the camera. For example, FIG. 4A is an example of computing device 400 as it is being moved in the direction of motion 310 as if to capture a panoramic image in a landscape format. In this regard, as the user 220 attempts to capture a panoramic image, the computing device 120 may be aimed at a portion of a point of interest 430. The direction of the field of view 420 of the computing device 120 may determine which portion of the point of interest 430 is being captured in a recorded video frame. As the user 220 attempts to capture the entire point of interest 430, the computing device 120 may be rotated relative to an axis in the direction of motion 310, thereby rotating the field of view 420 to different portions of the point of interest 430.

In order to detect motion associated with an attempt to take a panoramic image, each of the recorded video frames may be analyzed. For example, each recorded video frame may be analyzed to determine and map gradient-based key points or tracking features between frames of the recoded video frames. Tracking features may include windows of pixels which contain sufficient texture to enable their matching between recorded video frames. In one example, techniques that detect salient features within a recorded video frame and map the displacement of the salient features between recorded video frames by matching intensity values of the salient features between recorded video frames, as found in the Kanade-Lucas-Tomasi (KLT) feature tracking technique, may be used to determine and map the tracking features.

A single recorded video frame may be analyzed to determine a plurality tracking features, such as 100 or more or less. In the example 440 of FIG. 4B, a recorded video frame 450 with tracking features may be determined. The recorded video frame 450 may contain an image taken when the field of view 420 was aimed at a portion of the point of interest 430. The recorded video frame 450 may be analyzed to determine tracking features 460, 470, and 480.

Figure 5:
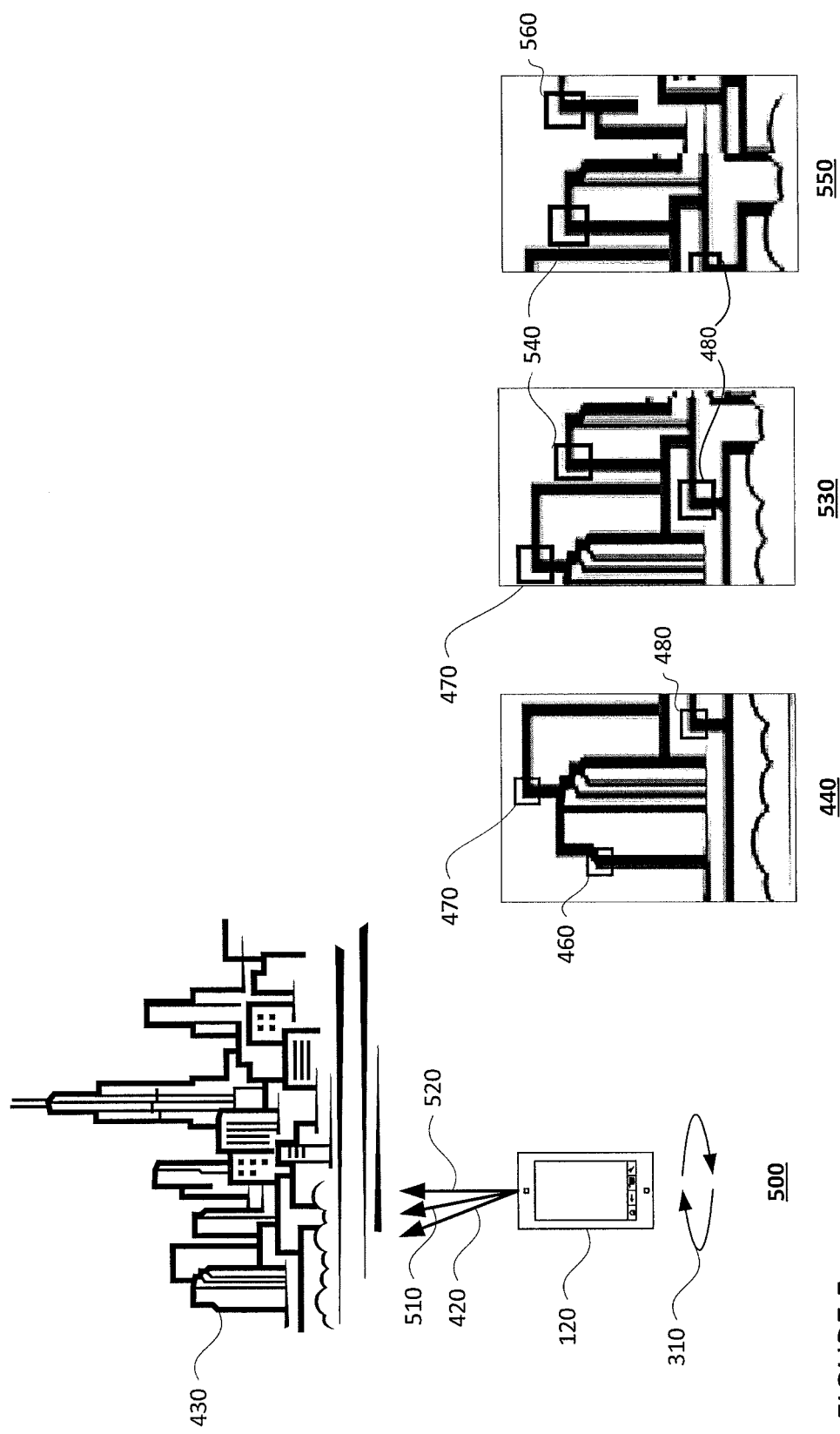
FIG. 5 is an example of a set of images and tracking features in accordance with aspects of the disclosure.

As the computing device is moved, the features captured in the recorded video frames may change and thus some tracking features may be gained and others lost between recorded video frames as shown in FIG. 5. In the example 500 of FIG. 5, a computing device 120 may be rotated relative to the axis in the direction of motion 310 to switch the field of view from 420 to 510 to 520. For example, field of view 420 may result in recorded video frame 440 being captured. Recorded video frame 440 may then be analyzed to determine tracking features 460, 470, and 480. As the computing device 120 is rotated in the direction of motion 310, the field of view may change from 420 to 510. Field of view 510 may result in recorded video frame 530 being captured. Recorded frame 530 may then be analyzed and tracking features 470, 480, and 540 may be determined. In this regard, tracking features 460 was lost and tracking feature 540 was gained as the computing device 120 went from field of view 420 to 510. As the computing device 120 progresses in the direction of motion 310, field of view 510 may change to field of view 520. Field of view 520 may result in recorded video frame 550 being captured. Recorded video frame 550 may then be analyzed and tracking features 480, 540, and 560 may be determined. In this regard, tracking feature 470 was lost and tracking feature 560 was gained as the computing device 120 went from field of view 510 to 520.

In some examples, when the number of tracking features lost between two of the recorded video frames is greater than or equal to a threshold value, new tracking features may be added and tracked. In addition, tracking features that are not included in at least a predetermined number of recorded video frames, such as 5 recorded video frames or more or less, may be discarded as such tracking features may be considered unreliable for failing to provide sufficient motion data.

A set of frame-based features may be determined from the tracking features. For instance, the set of frame-based features may include a median displacement of all tracking features in the positive and negative X axis, a median displacement of all tracking features in the positive and negative Y axis, and a median angle difference to axis aligned motion of all tracking features as shown in Table 1.

Regarding Table 1 below, each frame based feature of a set of frame based features may be assigned an identification number (ID) wherein, each frame based feature may be determined by a respective formula as shown under the "Frame-based features" column. In Table 1, ID's #1-#4 correspond to the median displacement in the positive and negative X and positive and negative Y directions, respectively. ID #5 corresponds to median angle difference to axis aligned motion. Regarding the formulas of ID's #1-#4, $X_+$, $X_-$, $Y_+$, and $Y_-$ represent the axis displacement of every track within a recorded video frame, in the positive and negative X and positive and negative Y directions, respectively. The image_height and image_width stand for the height and width of the recorded video frame, respectively. Regarding ID #5 of Table 1, X stands for the displacement of every tracking feature within the recorded video frame along the x axis and h stands for the hypotenuse of the displacement of every tracking feature within the recorded video frame. In Table 1 $Med_{tracks}$ refers to taking the median value of the displacement of every tracking feature within the recorded video frame, within the respective formulas. For example, in ID #1 $Med_{tracks}$ would refer to taking the median value of the displacement of every tracking feature within the recorded video frame along the positive x axis.

TABLE 1

| ID | Frame-based features |
|---|---|
| #1 | $MED_{tracks}$ ($X_+$/image_width) |
| #2 | $MED_{tracks}$ ($X_-$/image_width) |
| #3 | $MED_{tracks}$ ($Y_+$/image_height) |
| #4 | $MED_{tracks}$ ($Y_-$/image_height) |
| #5 | $MED_{tracks}$ (min(\|arcsin(X/h)\|, 90 − \|arcsin(X/h)\|)) |

In order to determine the median displacements the relative location of each given tracking feature within a recorded video frame may be compared with the relative locations of the given tracking features within reference recorded video frames where the given tracking features were first detected. The comparison may be used to determine the displacement in the positive and negative X and positive and negative Y directions for each tracking feature within the recorded video frame relative to the locations of each given tracking feature within the respective reference recorded video frames. The values for all tracking features within the recorded video frame may then be ordered to determine the to determine the median displacements in the positive and negative X and positive and negative Y directions.

Figure 6:
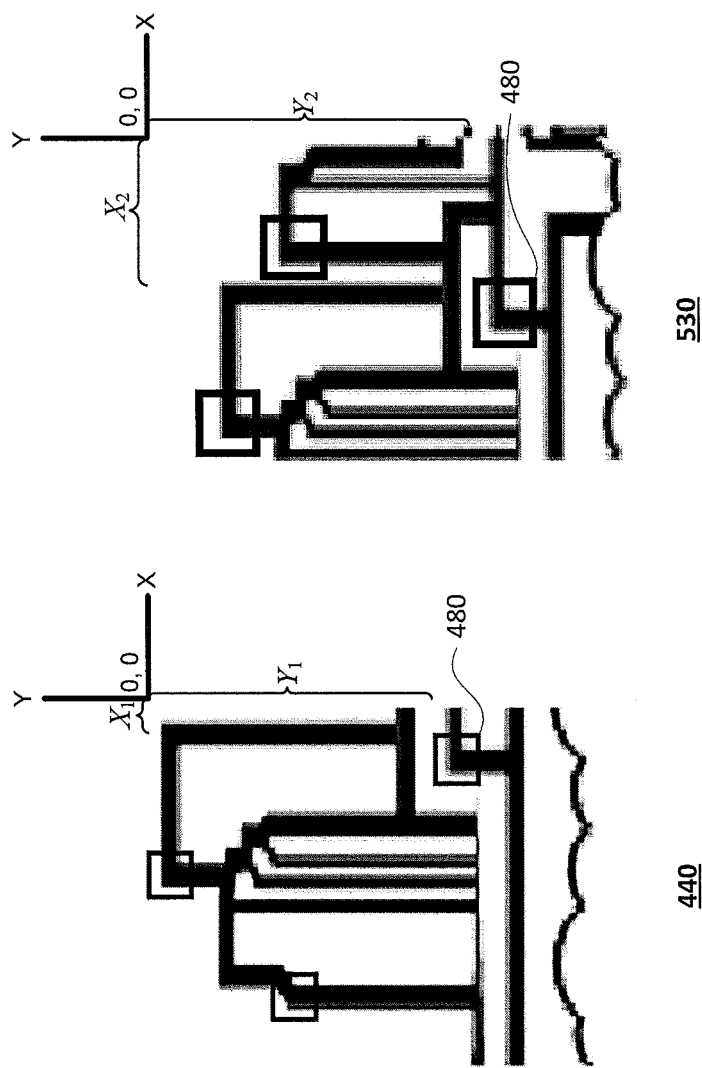
FIG. 6 is an example a set of images and displacement of tracking features in accordance with aspects of the disclosure.

In the example 600 of FIG. 6, tracking feature 480 is used to demonstrate how displacement of a single tracking feature may be determined. In this regard, recorded video frames 440 and 530 are shown to both include tracking feature 480, wherein tracking feature 480 was first detected in frame 440. In recorded video frame 440, tracking feature 480 is shown to be at a location of $(X_1, Y_1)$. In recorded video frame 530, tracking feature 480 is shown to be at a location of $(X_2, Y_2)$. The displacement of the of tracking feature 480 between recorded video frames 440 and 530 may be determined by taking the difference between $X_1$ and $X_2$, as well as the difference between $Y_1$ and $Y_2$. Using the resultant distances, the displacement in the positive and negative X and positive and negative Y directions for tracking feature 480 may be determined. The values for all of the tracking features within recorded video frame 530 may then be ordered to determine the median displacements in the positive and negative X and positive and negative Y directions.

The median displacements for each recorded video frame may also be normalized. In one example, the median displacements may be normalized with respect to a width, in pixels, of the recorded video frames by dividing the median displacements by the width. The recorded video frame's height and width may be defined by the features of the camera of the computing device. This normalization may occur before or after the median displacements are determined, in other words, the displacements may be normalized before ordering the values for all of the tracking features.

To determine a median angle difference to axis aligned motion for a given recorded video frame, the angle difference to axis aligned motion for each tracking feature may be determined. The angle difference for each tracking feature may be based on the displacement of that tracking feature along the X axis, as well as a hypotenuse of that displacement. The median angle value for the given recorded video frame may be determined by averaging the angle values for each of the tracking features within the given recorded video frame.

Sets of frame-based feature elements may be accumulated in order to determine historical feature values for the recorded video frames. Historical feature values may be based on past user actions, which indicate whether or not a user is attempting to capture a panoramic image. In one example, a sliding window technique using a set number of recorded video frames may be used. As an example, a set number of frames, such as at least 5, 10, or 15 recorded video frames or more or less, may be used. A minimum number of recorded video frames, such as 5 or 10 or more or less may be needed before using the sliding window in order to provide useful historical information. As additional video frames are recorded, the recorded video frames within the sliding window may be updated by removing older recorded video frames and including the additional frames to maintain the set number of frames.

The historical feature values may be determined using the set of frame-based feature elements for all of the recorded video frames currently within the sliding window. The historical feature values may include an amount of motion, the axis alignment of that motion, and the angle of that motion. For example, the amount of motion may be determined by selecting a maximum value of the median displacement values for the positive and negative X and positive and negative Y directions for the set of frame-based feature elements within the sliding window as shown in Table 2.

Regarding Table 2 below, each historical feature value, shown under the "Historic feature" column, may be determined by the respective formulas shown adjacent to the historic features under the "Historic-based aggregation" column. As previously described in relation to Table 1, for each frame, ID's #1-#4 correspond to the median displacement in the positive and negative X and positive and negative Y directions, respectively, and ID #5 corresponds to median angle difference to axis aligned motion. In Table 2, MAX stands for maximum value and $MED_{frames}$ stands for the median value of the corresponding displacement of every frame currently within the sliding window. For example, $Med_{frames}(\#1)$ refers to taking the median value of the displacement in the positive X direction for all of the recorded video frames currently within the sliding window. As such, the amount of motion may be determined by selecting a maximum value of the median displacement values for the positive and negative X and positive and negative Y directions for the set of frame-based feature elements within the sliding window.

TABLE 2

| Historic feature | History-based aggregation |
| --- | --- |
| motion | MAX ($MED_{frames}(\#1)$, $MED_{frames}(\#2)$, $MED_{frames}(\#3)$, $MED_{frames}(\#4)$) |
| axis_aligned_motion | \|\|$MED_{frames}(\#1)$ − $MED_{frames}(\#2)$\| − \|$MED_{frames}(\#3)$ − $MED_{frames}(\#4)$\|\| |
| med_angle\| | $MED_{frames}(\#5)$ |

The axis alignment of motion may be determined by taking, for the set of frame-based feature elements within the sliding window, a first absolute value of a difference between the median displacement on the positive X axis and the median displacement on the negative X axis, and taking a second absolute value of a difference between the median displacement on the positive Y axis and the median displacement on the negative Y axis. The axis alignment of motion may be determined by the absolute value of the difference between the first and second absolute values. In addition, the angle of that motion may be determined based on a median of all of the median angle differences for the set of frame-based feature elements within the sliding window as shown in Table 2. As the sliding window is updated, the historical feature values may also be updated.

Figure 7:
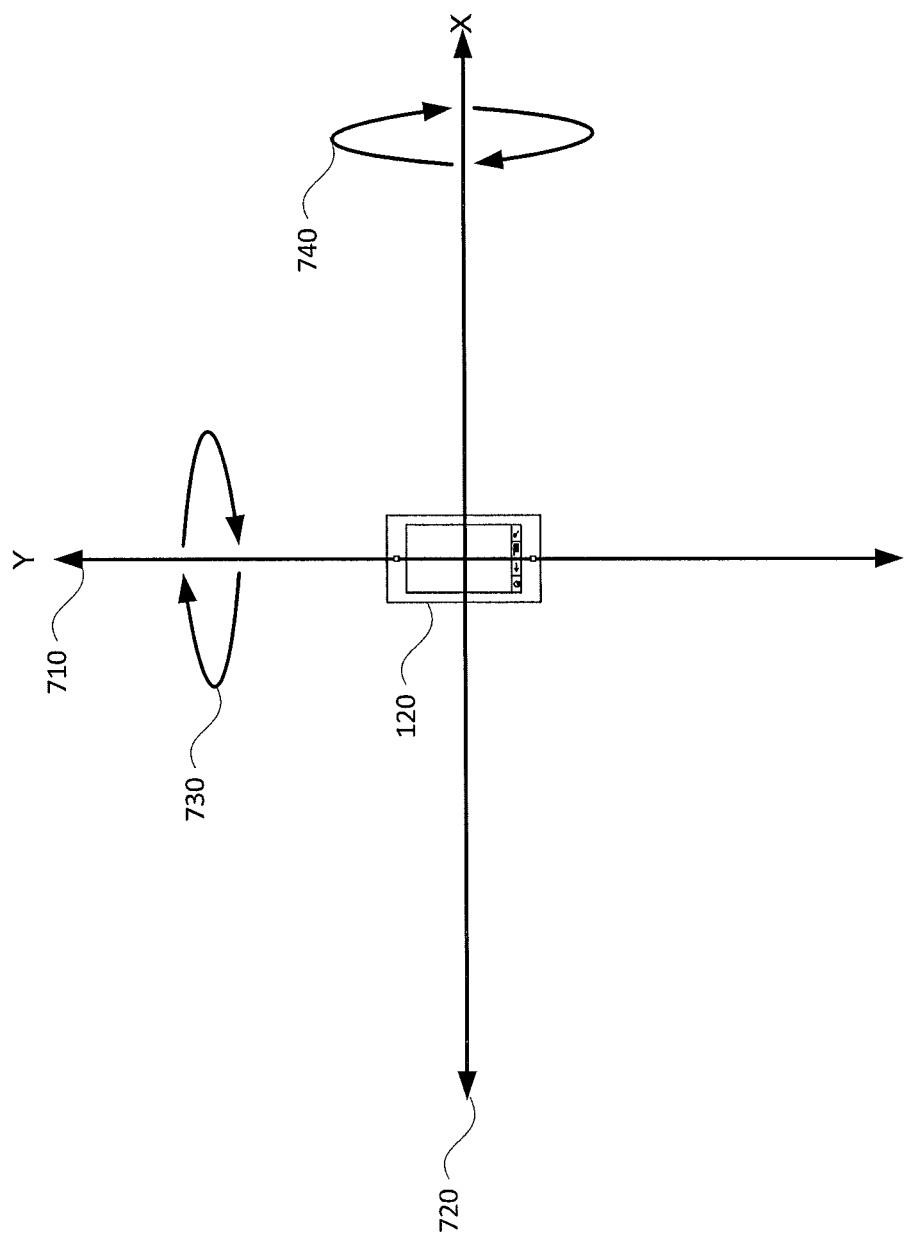
FIG. 7 an example of axis aligned motion in accordance with aspects of the disclosure.

Each of the historical feature values may be evaluated to determine whether or not a user is attempting to capture a panoramic image. For example, when the amount of motion is within a predetermined range this may indicate that a user is attempting to capture a panoramic image. When the direction of the motion is within a predetermined range relative to the X or Y axes (such as very close to 0) as shown in FIG. 7, this may further indicate that the user is attempting to capture a panoramic image. In the example 700 of FIG. 7, different types of motion that produce a direction of motion within a predetermined range relative to the X or Y axes, as would be expected when a user is attempting to capture a panoramic image is shown. In this regard, direction of horizontal motion 730 around a y-axis 710 may be used to create a panoramic image in a landscape format and vertical motion 740 around a x-axis 720 may be used to create a panoramic image in a portrait format. When the user moves the computing device 120 around an axis which deviates from the x-axis 720 or y-axis 710 by an amount greater than a predetermined range, this may indicate that a user is not attempting to capture a panoramic image.

Figure 8:
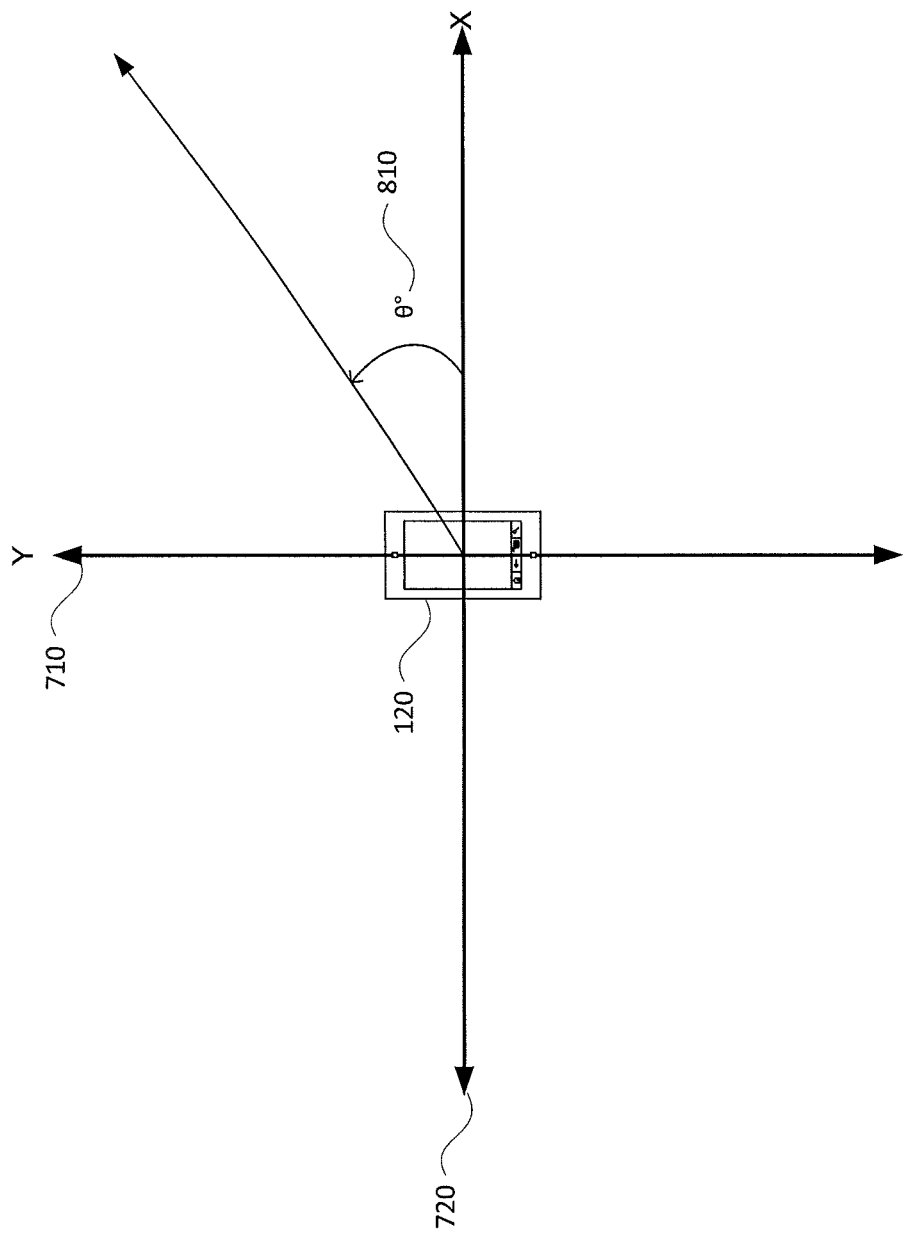
FIG. 8 is an example of an angle range in accordance with aspects of the disclosure.

When the angle of the motion is within a predetermined angle range, such as close to 0, 90, 180, or 270 degrees, this may indicate that a user is attempting to capture a panoramic image as shown in FIG. 8. In the example 800 of FIG. 8, a computing device 120 may capture a panoramic image along a horizontal x-axis 720. As the user moves the computing device 120 along the x-axis 720, the computing device may move off of the x-axis 720, towards the y-axis 710, by an angle 810. The angle 810 may be compared to a predetermined angle range. When the angle 810 is within the predetermined angle range, this may indicate that a user is attempting to capture a panoramic image.

Figure 9:
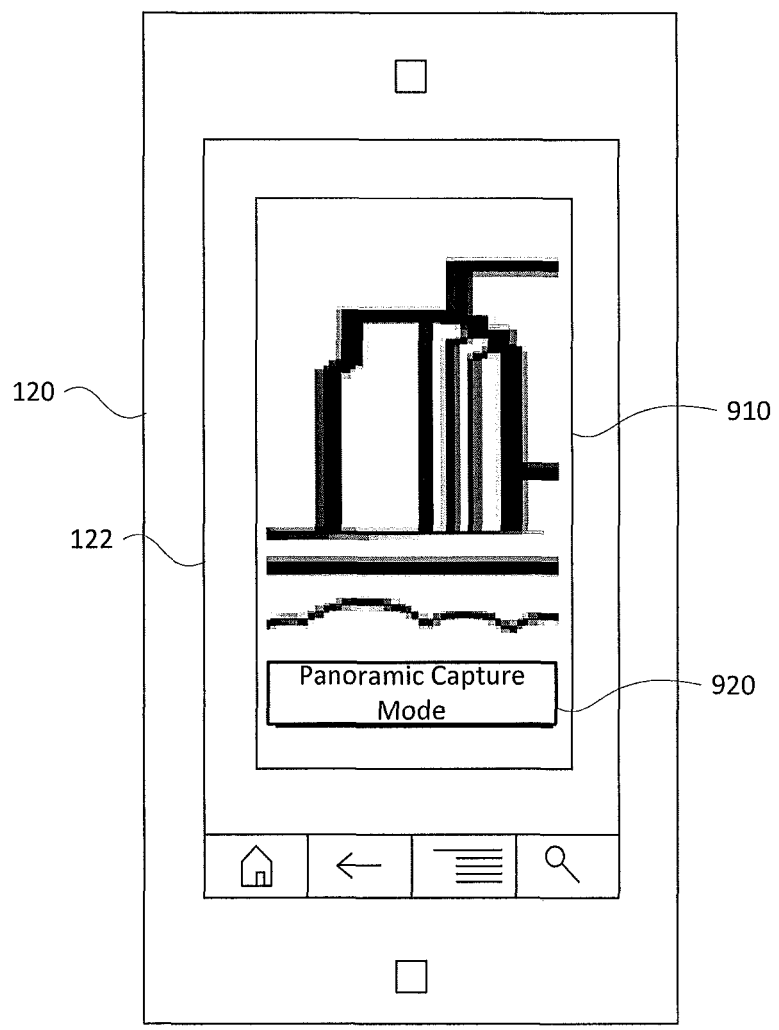
FIG. 9 is a client computing device and screen shot in accordance with aspects of the disclosure.

In one example, when all of the historical feature values are within the predetermined ranges, the computing device may determine that the user is attempting to capture a panoramic image as shown in FIG. 9. In example 900, of FIG. 9 the computing device 120 may determine that the user is attempting to capture a panoramic image. Accordingly, the computing device's display 122, may provide a notification 920 that indicates that the computing device 120 has entered a panoramic image capture mode. The computing device's display 122, may also present the portion of the scene which is currently being captured 910.

When the computing device confirms that the motion corresponds to a user attempting to capture a panoramic image, the computing device may automatically switch to a panoramic capture mode or simply convert the recorded video frames into a panoramic image. Thus, movement of the computing device by the user may be used to capture a panoramic image even where the computing device is not operating in a panoramic capture mode. In one example, once the computing device has determined that the user is attempting to capture a panoramic image, the computing device may switch to a panoramic image capture mode. In this regard, one or more of the recorded video frames and one or more additional video frames captured after the determination may be used to generate a panoramic image. In some examples, the same techniques used to track the tracking features between recorded video frames may also be used to generate the panoramic image.

When any one of the historical feature values is outside of the predetermined ranges, this may indicate that the user is not attempting to capture a panoramic image. In this case, the computing device may continue to determine and evaluate the historical feature values as the sliding window is updated. This updating may continue until the computing device has determined that the user is attempting to capture a panoramic image or until a maximum number of video frames have been recorded. The maximum number of frames may be based on a predetermined number of frames, such as 200 or more or less, or an amount of time the camera waits, such as about 6 seconds or more or less.

In some examples, the recorded video frames may be downsized to reduce the amount of processing required by the computing device. In this regard, recorded video frames may include more graphical information than is necessary to determine and map tracking features between frames of the recoded video frames. Accordingly, in some aspects, the recorded video frames may be downsized to reduce their respective resolutions and consequently the amount of graphical information for each recorded video frame. Thus, the processing and other resources required to perform the aspects described above may be significantly reduced. In addition, this downsizing may affect the recorded video frame's height and width and thus the determination of the various features and values described above.

Figure 10:
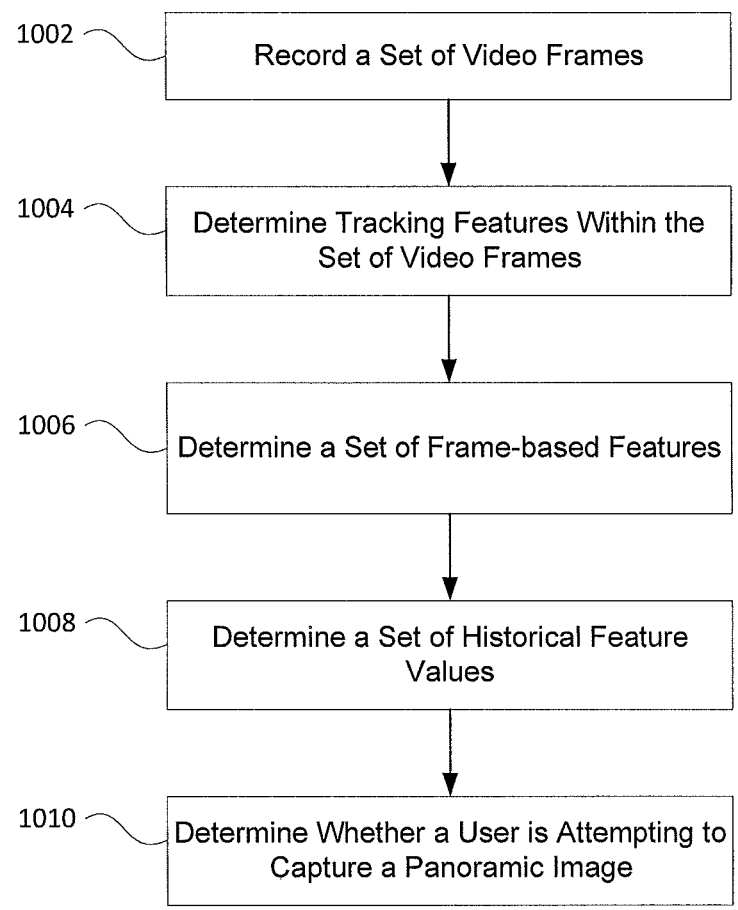
FIG. 10 is a flow diagram in accordance with aspects of the disclosure.

Flow diagram 1000 of FIG. 10 is an example flow diagram of some of the aspects described above that may be performed by one or more computing devices such as client computing devices 110, 120, 130, and 140. In this example, at block 1002, the one or more computing devices may record a set of video frames. The one or more computing devices may then determine tracking features within the set of video frames, as shown at step 1004. A set of frame-based features may then be found by the one or more computing devices, as shown in block 1006. As shown in block 1008, the one or more computing devices may then determine a set of historical feature values based on the set of frame-based features. The one or more computing devices may then determine whether a user is attempting to capture a panoramic image, as shown at step 1010.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for capturing panoramic images comprising:
   recording, with one or more processing devices, a set of video frames;
   determining, with the one or more processing devices, tracking features each including one or more features that appear in two or more recorded video frames of the set of video frames within the set of video frames;
   determining, with the one or more processing devices, a set of frame-based features based on a displacement of the tracking features between the two or more recorded video frames of the set of video frames;
   determining, with the one or more processing devices, a set of historical feature values based on the set of frame-based features based on the displacement of the tracking features;
   determining, with the one or more processing devices, whether a user is attempting to capture a panoramic image based on the set of historical feature values; and
   capturing, with the one or more processing devices, a panoramic image in response to determining that the user is attempting to capture a panoramic image.

2. The method of claim 1, wherein determining the set of frame-based features includes determining, between the two or more recorded video frames, at least one of a median displacement of the tracking features on a first positive coordinate axis and a first negative coordinate axis, a median displacement of the tracking features on a second positive coordinate axis and a second negative coordinate axis, and a median angle difference to axis aligned displacement of the tracking features.

3. The method of claim 2, wherein determining the median displacement of the tracking features on the first positive coordinate axis and the first negative coordinate axis further includes determining a distance between a given tracking feature in a current video frame and in a reference video frame relative to the first positive coordinate axis and the first negative coordinate axis, wherein the reference video frame is a first video frame in time of the set of video frames where the given tracking feature was determined.

4. The method of claim 2, wherein determining the median displacement of the tracking features on the second positive coordinate axis and the second negative coordinate axis further includes determining a distance between a given tracking feature in a current video frame and a reference video frame relative to the second positive coordinate axis and the second negative coordinate axis, wherein the reference video frame is a first video frame in time of the set of video frames where the given tracking feature was determined.

5. The method of claim 2, wherein determining the angle difference to axis aligned motion of tracking features includes determining a displacement of the tracking features and a hypotenuse of the displacement of a given tracking feature between a current video frame and a reference video frame, wherein the reference video frame is a first video frame in time of the set of video frames where the given tracking feature was determined.

6. The method of claim 2, wherein the set of historical features includes an amount of motion, and the method further comprises:
   prior to determining the set of historical features, accumulating sets of frame-based features for a predetermined number of consecutive video frames in the set of video frames; and
   determining the amount of motion using the accumulated sets of frame-based features, a maximum value of the median displacement of the tracking features on at least one of the first positive coordinate axis, the first negative coordinate axis, the second positive coordinate axis and the second negative coordinate axis.

7. The method of claim 2, wherein the set of historical features includes an axis alignment of motion and the method further comprises:
   prior to determining the set of historical features, accumulating sets of frame-based features for a predetermined number of consecutive video frames in the set of video frames; and
   determining the axis alignment of motion by:
      determining, from the accumulated sets of frame-based features, a first value by taking the absolute value of a difference between the median displacement on the first positive axis and the median displacement on the first negative axis,
      determining, from the accumulated sets of frame-based features, a second value by taking the absolute value of a difference between the median displacement on the second positive axis and the median displacement on the second negative axis, and determining an absolute value of the difference between the first value and the second value.

8. The method of claim 2, wherein the set of historical features includes a median angle and the method further comprises:
   prior to determining the set of historical features, accumulating sets of frame-based features for a predetermined number of consecutive video frames in the set of video frames; and
   determining the median angle by determining, from the accumulated sets of frame-based features, a median of the angle difference to axis aligned motion of tracking features.

9. The method of claim 1, wherein determining the set of frame-based features further includes normalizing each feature of the set of frame-based features by at least one of a width and height of any video frame of the set of video frames.

10. The method of claim 1, wherein the method further includes, before determining the tracking features:
    downsizing the set of video frames; and
    normalizing each feature of the set of frame-based features by at least one of a downsized width and downsized height of any downsized video frame of the set of video frames.

11. The method of claim 1, wherein, determining whether the user is attempting to capture a panoramic image further includes determining whether the set of historical feature values satisfies a set of predetermined threshold values.

12. A system for capturing panoramic images comprising:
    one or more computing devices; and
    memory storing instructions, the instructions executable by the one or more computing devices;
    wherein the instructions comprise:
        recording, with one or more computing devices, a set of video frames;
        determining, with the one or more computing devices, tracking features each including one or more features that appear in two or more recorded video frames of the set of video frames within the set of video frames;
        determining, with the one or more computing devices, a set of frame-based features based on a displacement of the tracking features between the two or more recorded video frames of the set of video frames;
        determining, with the one or more computing devices, a set of historical feature values based on the set of frame-based features based on the displacement of the tracking features;
        determining, with the one or more computing devices, whether a user is attempting to capture a panoramic image based on the set of historical feature values; and
        capturing, with the one or more computing devices, a panoramic image in response to determining that the user is attempting to capture a panoramic image.

13. The system of claim 12, wherein the instructions further include:
    determining the set of frame-based features includes determining, between the two or more recorded video frames, at least one of a median displacement of the tracking features on a first positive coordinate axis and a first negative coordinate axis, a median displacement of the tracking features on a second positive coordinate axis and a second negative coordinate axis, and a median angle difference to axis aligned displacement of the tracking features.

14. The system of claim 13, wherein the instructions further include:
    determining the median displacement of the tracking features on the first positive coordinate axis and the first negative coordinate axis further includes determining a distance between a given tracking feature in a current video frame and in a reference video frame relative to the first positive coordinate axis and the first negative coordinate axis, wherein the reference video frame is a first video frame in time of the set of video frames where the given tracking feature was determined.

15. The system of claim 13, wherein the instructions further include:
    determining the median displacement of the tracking features on the second positive coordinate axis and the second negative coordinate axis further includes determining a distance between a given tracking feature in a current video frame and a reference video frame relative to the second positive coordinate axis and the second negative coordinate axis, wherein the reference video frame is a first video frame in time of the set of video frames where the given tracking feature was determined.

16. The system of claim 13, wherein the instructions further include:
    determining the angle difference to axis aligned motion of tracking features includes determining a displacement of the tracking features and a hypotenuse of the displacement of a given tracking feature between a current video frame and a reference video frame, wherein the reference video frame is a first video frame in time of the set of video frames where the given tracking feature was determined.

17. The system of claim 13, wherein the set of historical features includes an amount of motion, and the instruction further include:
    prior to determining the set of historical features, accumulating sets of frame-based features for a predetermined number of consecutive video frames in the set of video frames; and
    determining the amount of motion using the accumulated sets of frame-based features, a maximum value of the median displacement of the tracking features on at least one of the first positive coordinate axis, the first negative coordinate axis, the second positive coordinate axis and the second negative coordinate axis.

18. The system of claim 13, wherein the set of historical features includes an axis alignment of motion and the instructions further include:
    prior to determining the set of historical features, accumulating sets of frame-based features for a predetermined number of consecutive video frames in the set of video frames; and
    determining the axis alignment of motion by:
        determining, from the accumulated sets of frame-based features, a first value by taking the absolute value of a difference between the median displacement on the first positive axis and the median displacement on the first negative axis,
        determining, from the accumulated sets of frame-based features, a second value by taking the absolute value of a difference between the median displacement on the second positive axis and the median displacement on the second negative axis, and
        determining an absolute value of the difference between the first value and the second value.

19. The method of claim 2, wherein the set of historical features includes a median angle and the method further comprises:

prior to determining the set of historical features, accumulating sets of frame-based features for a predetermined number of consecutive video frames in the set of video frames; and determining the median angle by determining, from the accumulated sets of frame-based features, a median of the angle difference to axis aligned motion of tracking features.

20. A non-transitory computer-readable medium storing instructions that, when executed by one or more processors, cause the one or more processors to perform the steps of:

recording a set of video frames;

determining tracking features each including one or more features that appear in two or more recorded video frames of the set of video frames within the set of video frames;

determining a set of frame-based features based on a displacement of the tracking features between the two or more recorded video frames of the set of video frames;

determining a set of historical feature values based on the set of frame-based features based on the displacement of the tracking features;

determining whether a user is attempting to capture a panoramic image based on the set of historical feature values; and capturing a panoramic image in response to determining that the user is attempting to capture a panoramic image.

* * * * *